United States Patent [19]
Urban

[11] 3,815,890
[45] June 11, 1974

[54] WELDING JIG

[76] Inventor: Leonard Urban, 10909 Cordova, Albuquerque, N. Mex. 87112

[22] Filed: Aug. 10, 1972

[21] Appl. No.: 279,452

[52] U.S. Cl.................... 269/43, 269/73, 269/296, 228/44, 29/160
[51] Int. Cl............................................ B23p 15/12
[58] Field of Search.............. 29/160, 200 J, 202 R; 228/44, 57; 227/152, 153; 269/41–45, 296, 321 F, 321 S

[56] References Cited
UNITED STATES PATENTS

| | | | |
|---|---|---|---|
| 1,709,128 | 4/1929 | Gurian............................ | 269/41 X |
| 1,949,007 | 2/1934 | Butler............................. | 269/43 X |
| 2,188,433 | 1/1940 | Friese............................ | 269/296 X |
| 3,381,870 | 5/1968 | Haskins.......................... | 227/153 X |
| 3,568,289 | 3/1971 | Jenkins, Sr. et al. ................. | 29/160 |

*Primary Examiner*—Roy Lake
*Assistant Examiner*—Neil Abrams

[57] ABSTRACT

A method and mechanism for assembling, clamping and welding metal frames and gratings comprising a support frame rotatably mounted about its center in a vertical plane and employing means for holding a plurality of pieces of bar stock in juxtapositioned, predetermined spaced rows. End members are held against the ends of the bar stock and welded thereto to form the frame or grating structure.

3 Claims, 7 Drawing Figures

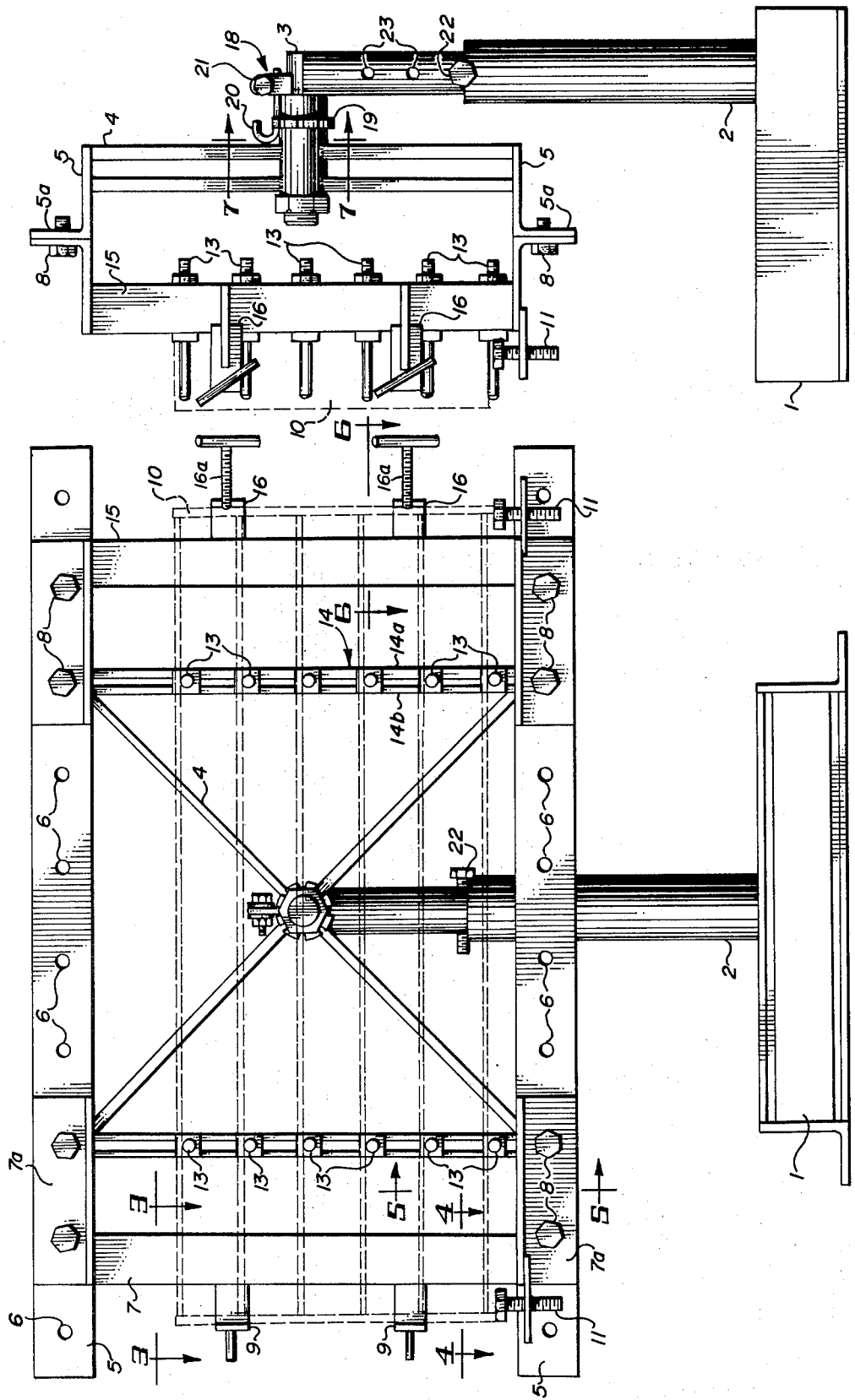

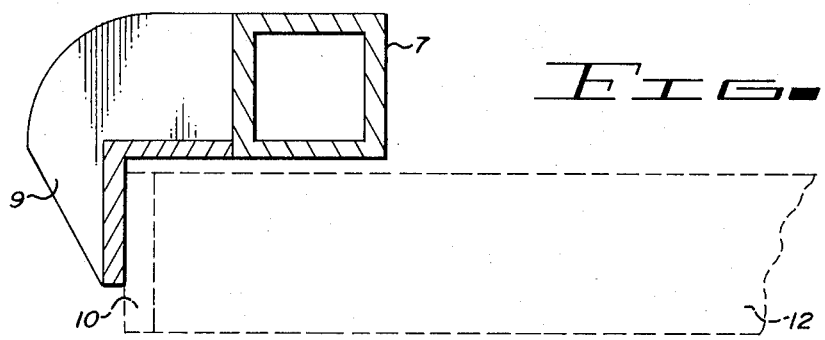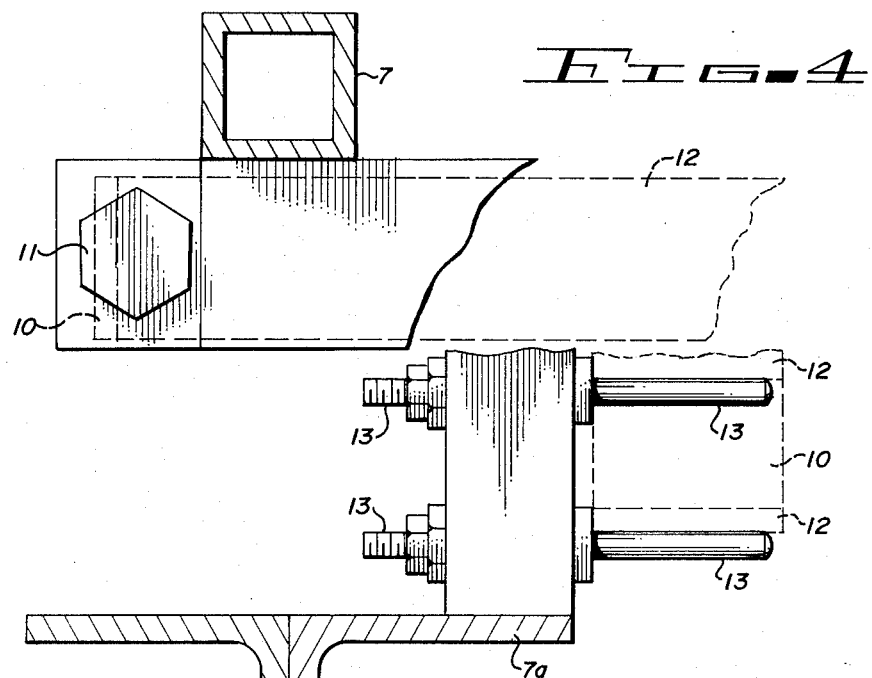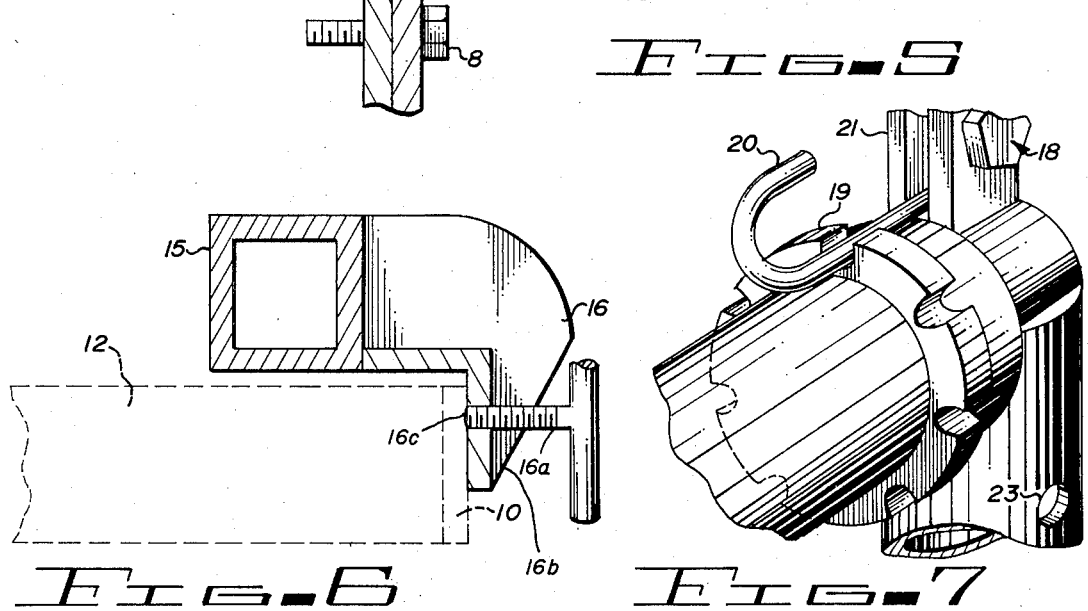

WELDING JIG

BACKGROUND OF THE INVENTION

This invention relates to jigs and fixtures, and more particularly a device for positioning and holding bar stock during a welding operation in the repetitive manufacture of metal frames and gratings.

1. Field of the Invention

This invention is particularly directed to the manufacture of a variety of metal frames and gratings for manholes, catch basins, valve boxes, open water channels and the like by a novel welding jig easily adjusted for various frame or grating specifications.

2. Description of the Prior Art

Heretofore, the parts to be welded were clamped to a steel-topped table which formed a temporary jib for assembling and welding the parts into a frame, grating or other useful structure. The obvious disadvantages of this procedure were that the jig had to be reconstructed each time a different size, number of bars, or spacing between the bars was required. Further, the welding often had to be done in an awkward position and was not easily executed. Thus, a need exists for an adjustable jig capable of assembly of any length and width of frame or grating within the capacity of the jig with spacings between the parts of the frame or grating being easily adjustable. The jig must be movable to position the work in the most advantageous position for welding.

SUMMARY OF THE INVENTION

In accordance with the invention claimed, a new and improved method of assembling, clamping and welding and a jig for accomplishing said method is provided for the production of welded metal frames and gratings used in the construction industry. The jig provided is rotatable so that all joints may be positioned for easy welding. The jig may be adjusted for the manufacture of various sized frames and gratings employing a variety of parts and spacings therebetween, yet capable of manufacturing a large number of identical pieces. Any size frame or grating within the limits of the jig can be assembled, and conversion from one size or configuration to another is easily accomplished.

It is, therefore, one object of this invention to provide a new method for manufacturing metal frames and gratings.

Another object of this invention is to provide a new and improved jig for manufacturing metal frames and gratings.

A further object of this invention is to provide a new and improved jig or fixture for positioning bar stock in juxtapositioned arrangement for welding members across their ends.

A still further object of this invention is to provide a new and improved rotatably mounted jig arranged for repetitively positioning bar stock in one of a plurality of positions for welding.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings, in which:

FIG. 1 is a front elevation of a jig assembled and adjusted for the production of welded metal gratings having six longitudinal bars shown in dashed lines;

FIG. 2 is an end elevation of the jig shown in FIG. 1;

FIG. 3 is a cross-sectional view of FIG. 1 taken on the line 3—3 illustrating details of the fixed clamping jaws;

FIG. 4 is a cross-sectional view of FIG. 1 taken on the line 4—4 illustrating details of one of the adjustable end bar supports;

FIG. 5 is a cross-sectional view of FIG. 1 taken on the line 5—5 illustrating details of the longitudinal bar support pin installed between two parallel bars of an end frame, FIG. 6 is a cross-sectional view of FIG. 1 taken on the line 6—6 illustrating details of one of the adjustable clamping jaws with an end bar of the work clamped against the ends of the longitudinal bars shown in dash lines; and FIG. 7 is a cross-sectional view of FIG. 1 taken along the line 7—7 showing details of the locking means for preventing rolling of the jig.

DESCRIPTION OF THE PREFERRED EMBODIMENT

Referring particularly to the drawings by characters of reference, FIGS. 1–7 disclose a welding jig comprising a base 1 having a pedestal of adjustable height 2 attached thereto. A support shaft 3 is attached to the top of the pedestal and projects laterally therefrom as shown. A support frame 4 is rotatably journalled at its center in bushing on the support shaft 3 and comprises two parallel support right angular side members 5 mounted at the top and bottom of the frame with a leg 5a of each member arranged in a common vertical plane. Each of legs 5a has equally spaced tapped holes 6 extending therethrough throughout its length.

As the left end of the jig is arranged a fixed end frame member 7 bolted transversely to the parallel support angular members 5 through corresponding pairs of holes 6 in members 5 by cap screws 8 installed through end frame attachment angular members 7a. Attached to end member 7 are at least two fixed clamping jaws 9 which project outwardly therefrom in order to restrain one of the end bars 10 (shown in dash lines in FIG. 1). Bar 10 is arranged transversely across six longitudinal bars 12, also shown in dash lines, forming the work to be welded. FIG. 3 is a partial cross-sectional view showing one of the fixed clamping jaws 9 with end bar 10 and a longitudinal bar 12 in position for clamping.

An adjustable end frame member 15 is likewise bolted to support members 5 by bolts 8 extending through holes 6 at the same distance from the center of the support frame 4 as is the fixed end frame member 7. End frame member 15 has a number of adjustable clamping jaws 16 corresponding with and opposed to the fixed clamping jaws 9 of the end frame member 7 and are provided for the purpose of restraining the other end bar 10 of the work in place.

FIG. 6 is a partial sectional view on line 6—6 of FIG. 1 showing one of the adjustable clamping jaws 16 in detail with end bar 10 and a longitudinal bar 12 in position with the clamps tightened to hold the work together in a frame or grate configuration. These clamping jaws, which are integral with frame member 15 and extend outwardly therefrom each comprise a hand turned bolt 16a which is in threaded arrangement with a tapped hole exending through the hooked end 16b of the clamp so that its free end 16c can be turned into engagement with end bar 10. End bar 10 is forced by bolt 16a of each clamp into engagement with the ends of the longitudinal bars 12, as shown in FIGS. 1 and 6 of the drawing.

Each of the end frame members 7 and 15 has an adjustable end bar support 11 which positions end bars 10 in proper transverse position relative to the longitudinal bars 12 during assembly and clamping of the work.

In accordance with the invention claimed, a pair of pin supporting bars 14 are transversely arranged between members 5. Each bar 14 comprises a pair of spaced parallelly arranged members 14a and 14b which support between them a plurality of threaded pins or bolts 13 which may be selectively positioned along the length of bars 14. When positioned, each pin or bolt is clamped in place on bars 14 with their common ends extending outwardly of bars 14 for supporting, when the frame is in a vertical position, bars 12 as shown.

FIG. 5 is a partial sectional view on line 5—5 of FIG. 1 showing a section of one support frame member 5, a section of one end frame member 7a, cap screw 8, support bar 14, and a support pin 13 supporting longitudinally bar 12 of the work.

FIGS. 1 and 7 illustrate one suitable locking means for holding the frame in a given position and comprises a serrated collar 19 fixedly attached to a sleeve of frame 4 surrounding shaft 3 and a pin 20 arranged to be positioned in one of the serrations of the collar at one end and arranged to extend into suitable openings in a clamp 21 holding shaft 3 to the pedestal 2. Pedestal 2 may be arranged for height adjustment by placing bolt 22 through one of a plurality of holes 23 in the pedestal.

Referring particular to FIGS. 1 and 2, in assembling a grating or other structure, frame 4 is first arranged in a vertical position. End bar supports 11 and support pins 13 are then properly positioned with the longitudinal bars 12 of the work placed on support pins 13. End bars 10 of the work are then placed against the fixed clamping jaws 9. The other end bar 10 is then rested on the adjustable end bar supports 11, and the adjustable clamping jaws are tightened to clamp the work together. The locking means 18 shown in FIGS. 1 and 7 is then released and the jig rotated to a position suitable for welding one or more joints of the work pieces together. The locking means is locked before each welding operation to secure the jig against rotation during the welding process. When welding in this position is completed, the jig is rotated to another position and the process repeated until all welds have been executed.

When it is necessary to change the length of the frame or grating under production, cap screws 8 are removed and end frames 7 and 15 relocated either closer together or farther apart, utilizing appropriate pairs of holes 6 in the parallel support members 5 of the support frame 4.

Although but one embodiment of the present invention has been illustrated and described, it will be apparent to those skilled in the art that various changes and modifications may be made therein without departing from the spirit of the invention or from the scope of the appended claims.

What is claimed is:

1. A fastening jig comprising:
 a base,
 a pedestal attached to the base,
 a support shaft arranged to extend laterally from said pedestal, and
 a support frame rotatably mounted at its center on the support shaft,
 said support frame comprising two longitudinal side members,
 a pair of end members, each of said end members being selectively positioned transversely between said side members to form a frame of various lengths,
 one of said end members being provided with jaw means for positioning at a given place a work piece transversely between said side members,
 a pair of work support bars transversely arranged between said side members of said frame and attached thereto for supporting a plurality of support pins,
 a plurality of support pins, said support pins extending laterally from said support bars in a common direction for supporting work pieces longitudinally arranged between said end members during fastening operations on said work pieces,
 at least some of said support pins being selectively positioned along said support bars,
 the other of said end members being provided with adjustable clamping means for holding work pieces arranged longitudinally between said pair of end members on said pins against said one of said end members, and
 a locking means for holding said support frame selectively at one of a plurality of positions on said base during fastening operations.

2. The welding jig set forth in claim 1 wherein:
said pedestal is of an adjustable height.

3. The welding jigs set forth in claim 1 wherein:
said support bars each comprise a pair of spacedly arranged juxtapositioned members having said support pins selectively positioned and firmly held therebetween.

* * * * *